United States Patent
Tränkle

(10) Patent No.: US 7,680,476 B2
(45) Date of Patent: Mar. 16, 2010

(54) RECEIVING DEVICE

(75) Inventor: Günther Tränkle, Neu-Ulm (DE)

(73) Assignee: Infineon Technologies AG, Neubiberg (DE)

( * ) Notice: Subject to any disclaimer, the term of this patent is extended or adjusted under 35 U.S.C. 154(b) by 752 days.

(21) Appl. No.: 11/427,192

(22) Filed: Jun. 28, 2006

(65) Prior Publication Data

US 2007/0021091 A1 Jan. 25, 2007

(30) Foreign Application Priority Data

Jun. 29, 2005 (DE) .......... 10 2005 030 349

(51) Int. Cl.
 *H04B 1/16* (2006.01)
(52) U.S. Cl. ......... 455/337; 455/266.1; 455/240.1; 455/234.1; 455/245.1; 455/130
(58) Field of Classification Search .......... 455/337, 455/226.1, 240.1, 234.5, 245.1, 130; 375/130, 375/346
See application file for complete search history.

(56) References Cited

U.S. PATENT DOCUMENTS

| | | | |
|---|---|---|---|
| 4,761,828 A | 8/1988 | Rinderle | |
| 4,893,090 A | 1/1990 | Boudewijns | |
| 5,564,094 A | 10/1996 | Anderson et al. | |
| 5,722,061 A * | 2/1998 | Hutchison et al. | 455/245.1 |
| 5,953,646 A | 9/1999 | Hirasawa | |
| 5,999,559 A * | 12/1999 | Takaki | 375/130 |
| 6,114,907 A | 9/2000 | Sakurai | |
| 6,175,279 B1 | 1/2001 | Ciccarelli et al. | |
| 6,498,926 B1 * | 12/2002 | Ciccarelli et al. | 455/240.1 |
| 6,937,675 B2 * | 8/2005 | Seo | 375/346 |
| 7,130,602 B2 | 10/2006 | Ciccarelli | |
| 2002/0132597 A1* | 9/2002 | Peterzell et al. | 455/130 |
| 2003/0124999 A1 | 7/2003 | Parssinen et al. | |

FOREIGN PATENT DOCUMENTS

| | | |
|---|---|---|
| JP | 01106607 | 4/1989 |
| JP | 01265725 | 10/1989 |
| JP | 08018500 | 1/1996 |
| JP | 11298348 | 10/1999 |
| JP | 2000183671 | 6/2000 |
| JP | 2001127658 | 5/2001 |

OTHER PUBLICATIONS

Search Report and Translation.

* cited by examiner

*Primary Examiner*—Sanh D Phu
(74) *Attorney, Agent, or Firm*—Edell, Shapiro & Finnan, LLC

(57) ABSTRACT

A receiving device having an input receiving an input signal which includes a useful signal and an interference signal, a demodulator coupled to the input and generating a demodulated output signal from the input signal, which has an adjustable operating point, and a detector coupled to the demodulator and determining from the output signal a characteristic value representing a power level of the interference signal and setting the operating point of the demodulator as a function of the characteristic value.

17 Claims, 4 Drawing Sheets ic number.

RECEIVING DEVICE

PRIORITY

This application claims priority from German Patent Application No. DE 10 2005 030 349.8, which was filed on Jun. 29, 2005, and is incorporated herein by reference in its entirety.

TECHNICAL FIELD

The present invention relates to a receiving device as provided, for example, in mobile radio systems.

SUMMARY

A receiving device may comprise an input receiving an input signal which comprises a useful signal and an interference signal, a demodulator coupled to the input and generating a demodulated output signal from the input signal, and a detector coupled to the demodulator and determining from the output signal a characteristic value representing a power level of the interference signal and setting an operating point of the demodulator as a function of the characteristic value.

A method of adapting a dynamic range of a receiving device, may comprise the steps of receiving a received signal which exhibits a useful signal and an interference signal, determining a characteristic number which represents a power level of the interference signal, and adjusting at least one limit of the dynamic range as a function of the characteristic number.

BRIEF DESCRIPTION OF THE DRAWINGS

In the text which follows, exemplary embodiments of the invention will be explained, by means of the drawing, in which.

DETAILED DESCRIPTION

Figure 1:
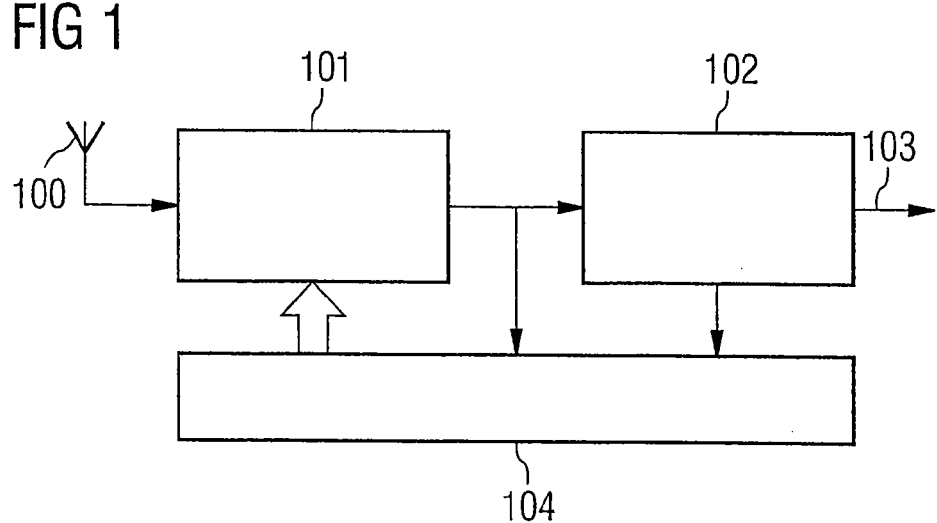
FIG. 1 shows a schematic representation of a receiving device according to one embodiment.

A receiving device usually has an input for receiving a received signal. The received signal is, for example, a radio signal by means of which data or information is transmitted. It is composed of a useful signal and interference signals.

The useful signal is transmitted by a transmitter by which the data or information is to be obtained. In the case of a mobile radio system, such a transmitter is, for example, a base station or a mobile radio transmitter. In the case of a radio or television system, the transmitter is, for example, a terrestrial television transmitter or a satellite transmitter.

The interference signals are produced, for example, by transmitters, the transmitted data or information of which is not intended for the receiving device. Such transmitters represent interfering transmitters for this receiving device. The interference signals are transmitted, for example, to more distant adjacent channels of the radio receiving system associated with the receiving device or to other radio receiving systems. The interference signals can also extend over a frequency band which is used for the useful signals. In some mobile radio devices, a transmitting device is also arranged in addition to the receiving device, which transmitting device transmits a transmit signal whilst the receiving device is receiving a signal from another transmitter. This is the case, for example, in a W-CDMA system such as UMTS.

The receiving device has a demodulator coupled to the input, which generates a demodulated output signal from the input signal. For this purpose, the demodulator has, for example, an amplifier which amplifies the input signal, or a mixer which converts the radio-frequency input signal down to low frequency bands, for example to a baseband signal.

When the receiving device is used in a mobile radio system, special demands with respect to minimum constructional size and low weight and at the same time long useful battery life are made on the receiving device. These requirements prescribe the lowest possible power consumption in battery-supported receiving devices which is gaining more and more importance as quality feature of the receiving device. Advances in the energy storage density of the batteries and accumulators used are compensated for to a very large extent by the ever higher frequency bands of new radio receiving systems and the enormously increased computing power in multimedia applications in mobile radio systems.

When the receiving device is used in a mobile radio system, a further aspect arises. With respect to the dynamic range of the signal to be processed, the receiving device will be designed in such a manner that even the smallest useful signals can be processed with adequate signal/noise ratio in the worst receiving situations. In particular, this means that the useful signal can be processed even in the presence of very strong interference levels coming from interfering transmitters. For this purpose, the receiving device reserves a very large dynamic range for the signal.

In the receiving devices according to the direct conversion or low IF principle, used in most cases today, for example in a receiving device according to the GSM (Global System for Mobile Communication) mobile radio standard most widely used in the world, the standard prescribes a dynamic range of approx. 80 dB. This value is obtained from the greatest interference signal level of −23 dBm which cannot be lowered by filters located in front of the active part of the receiving device, and the lowest useful-signal level of −102 dBm. The lowest useful-signal level corresponds to a signal/noise ratio of more than 9 dB. Similar conditions are found in most of the radio-based information transmission systems.

The dynamic limits of the dynamic range are defined by the following quantities. On the one hand, a maximum sensitivity is to be achieved which is typically given by a noise figure NF. The noise figure NF is defined by the deterioration in the signal/noise ratio at the output of the receiving device with respect to the signal/noise ratio at the input of the receiving device. The upper limit of the dynamic range is defined by the so-called compression point (CP). The compression point is a characteristic number which specifies the input signal strength at which the linearity of the receiving device is no longer achieved in accordance with the specifications of the radio system. Typically, the so-called $CP_{1dB}$ is specified as characteristic value at which the useful-signal amplification has dropped by 1 dB from the linear ideal amplification of the receiving device.

Since both the noise figure NF and the compression point $CP_{1dB}$ of the receiving device improve with the use of higher power, circuit sections of receiving devices providing a wide dynamic range exhibit relatively high current consumptions or power losses. A system specification of a radio receiving system is determined in such a manner that a scenario in which the ratio between useful signal and interference signal is poor can be also be managed. In the GSM system mentioned, one of these critical cases is the so-called close proximity case in which two mobile stations approach one another to a distance of one meter. At the same time, it is assumed that the mobile stations belong to different networks, that is to say are not synchronized, and the associated base stations have a maximum distance from the mobile stations. As a result, both mobile stations are receiving at their sensitivity limit and transmitting at maximum level. Since there is no synchronization between the mobile stations, one mobile station is an interfering transmitter with maximum interference level for the other mobile station acting as receiver. The receiving mobile station is, therefore, operating at its sensitivity limit.

This problem has commonly been solved by always operating a receiving device in the worst case scenario. During the determination of the operating-point settings of the receiving device needed for this purpose, which ensure reliable operation of the receiving device in the worst case, the worst interference-signal ratio at the input of the receiving device is taken into consideration, taking into consideration the filtering means available for the active part of the receiving device and a signal/noise ratio required at the output of the receiving device. In addition, the scattering of parameters occurring during the production of the receiving device must be considered. To meet the requirements of the worst case scenario, the receiving device requires a high current consumption. This is a significant disadvantage in mobile receiving devices since, as a rule, these are fed via a battery voltage and thus via a limited supply reserve.

In one embodiment, a receiving device is provided, the mean current consumption of is reduced.

In one embodiment, the receiving device has an input receiving an input signal which includes a useful signal and an interference signal. The input is coupled to a demodulator generating a demodulated output signal from the input signal. The demodulator has an adjustable operating point. The demodulator is coupled to a detector. This is set up in such a manner that it determines from the output signal a characteristic value representing a power level of the interference signal and sets the operating point of the demodulator as a function of the characteristic value.

By changing the operating point of the demodulator, a noise contribution in the output signal caused in the demodulator is also changed. Depending on the operating point setting, this noise contribution is higher or lower. A higher power supply from a voltage supply of the receiving device is associated with a low noise contribution. A lower power supply from a voltage supply of the receiving device is associated with a higher noise contribution.

The noise contribution is produced, for example, in an amplifier provided in the demodulator, or in a voltage-controlled oscillator provided there. The noise contribution is directly associated with the noise figure NF of the receiving device. The detector provided in the receiving device detects the power level of the interference signal. If the power level is lower than an extreme power level in a worst case scenario provided in a radio receiving system associated with the receiving device, i.e. a very low useful-signal level with simultaneous presence of a large interference-signal level, the operating point of the demodulator is set in such a manner that a higher noise contribution, and thus a higher noise figure NF, is present. A lower power supply of the voltage supply is required and, respectively, the current consumption of the receiving device is lowered. Since, in practice, such a worst case scenario occurs very rarely in most radio receiving systems, the operating point, as a rule, is adjusted in such a manner that the power supply is reduced. A maximum power supply of the voltage supply occurs, for example, in the worst case scenario. In contrast to the common approach, a current consumption is thus achieved which is distinctly reduced in the time average.

One embodiment deals with providing an adaptive receiving device which has a variable dynamic range, the operating point being adjusted as a function of the signal/noise ratio. This adaptation of the dynamic range brings a power consumption of the entire receiving device which is distinctly reduced in the time average with respect to common devices, the receiving device of which always meets the requirements of a worst case scenario. According to the an embodiment, the signal/noise ratio or interferer power, respectively, is monitored. The receiver can change from a current saving mode into a maximum dynamic range and conversely. One embodiment can be represented in such a manner that the operating point of the demodulator is adjusted as a function of the signal/noise ratio required by the system.

In one embodiment of the receiving device, a data processor coupled to the demodulator is provided which is suitable for converting the output signal into a useful digital signal and which is set up in such a manner that it determines from the useful digital signal a second characteristic number for a signal quality of the output signal.

As a result, it is advantageously possible to determine from the input signal a second characteristic number by means of which the receiving device can specify how good the useful signals received by it are.

In a further embodiment, the data processor is coupled to the detector. The detector is set up in such a manner that the operating point can be additionally adjusted as a function of the second characteristic number for the signal quality. Advantageously, the noise figure of the receiver can thus also be adjusted in the receiving device, in addition to the compression point CP. This provides for further lowering of the current consumption of the receiving device. The data processor determines as second characteristic value, values such as bit error rate (BER) or error vector magnitude (EVM), which are representative of the signal quality, for monitoring the noise contribution and/or the interferer power. By adapting noise figure and compression point at the same time, a high current saving potential is achieved. The reason for this is that a typical received useful-signal level is far above the sensitivity limits of the receiver of the receiving device and a signal/noise ratio is thus present which is far above the required minimum system value.

In one embodiment, the demodulator has an amplifier which has a common-gate structure. The common-gate structure is associated with the advantage that large changes in idling current of the supply voltage result in almost no change in amplification. The reason for this is that the amplification of a common gate structure is essentially the result of the ratio of the load impedance to the source impedance.

In another embodiment, the detector has a high-pass filter for selecting an interference signal from the output signal.

The high-pass filter is suitable for filtering the relevant interferer powers out of the power spectral density of the interference spectrum. The interferer power specifies the power level of the interference signal.

In a further embodiment of the receiving device, the receiving device is arranged in a multi-channel receiving device for receiving at least two receiving channels. The use of the receiving device in a multi-channel receiving device is of advantage especially because in a multi-channel receiving device with a multiplicity of receiving paths, the current is drawn several times. Due to the concept provided, the current consumption can be distinctly reduced in a single receiving path or also in all receiving paths so that the total current consumption of the multi-channel receiving device is lowered.

FIG. 1 shows a schematic representation of a receiving device according to one embodiment.

The receiving device has an antenna 100 for receiving a radio signal. The antenna 100 thus represents an input receiving the radio signal as an input signal. The radio signal is transmitted by a transmitter, not shown in FIG. 1, and is used for transmitting useful data via a radio channel. Due to disturbances on the radio channel, interference signals are superimposed on the radio signal so that the input signal provided by the antenna 100 has a useful signal and an interference signal.

The antenna 100 is coupled to a demodulator 101. The demodulator 101 is supplied to the input signal from the antenna 100. The demodulator 101 is set up in such a manner that it amplifies the input signal and converts it from the high frequency of the radio signal to a low frequency, for example to baseband or a low-IF signal. The demodulator 101 thus generates a demodulated output signal from the input signal. The demodulator 101 is also called analog front end or AFE, respectively.

The demodulator 101 is connected to a baseband-processor 102 which is designed as data processor. The baseband-processor 102 is used for generating useful digital data from the received useful signal. From these useful digital data, information transmitted via the radio signal is reconstructed or processed, respectively. To provide the useful digital data or the information, respectively, an output 103 is provided on the baseband-processor 102.

The demodulator 101 and the baseband-processor 102 are separately connected to a detector 104 provided in the receiving device. The detector 104 is supplied with the demodulated output signal of the demodulator 101. In the detector 104, a power level of the interference signal is determined from the demodulated output signal. As a function of the power level, an operating point of the demodulator 101 is set by the detector 104. The setting of the operating point determines the dynamic range of the demodulator 101. The operating point also determines a current consumption of the demodulator 101. The narrower the dynamic range set, the lower the current consumption of the demodulator 101.

The detector 104 is additionally supplied by the baseband-processor 102 with channel information about the signal quality on the radio channel. This channel information can be determined, for example, by the characteristics values providing information about the signal quality in the useful channel, e.g. the bit error rate (BER) or the error vector magnitude (EVM). The current consumption of the demodulator 101 can be reduced further as a function of the channel information. This is possible because a typically received power level of the useful signal is far above a sensitivity limit of the receiving device. Thus, idling currents, which have an influence on a noise characteristic of the receiving device, can be lowered in the voltage supply of the demodulator 101. A typical example of this is a current in the voltage supply of a mixer element of the demodulator 101. However, other components such as amplifier, voltage-controlled oscillators etc. also exist as noise source in the demodulator 101.

Figure 2A:
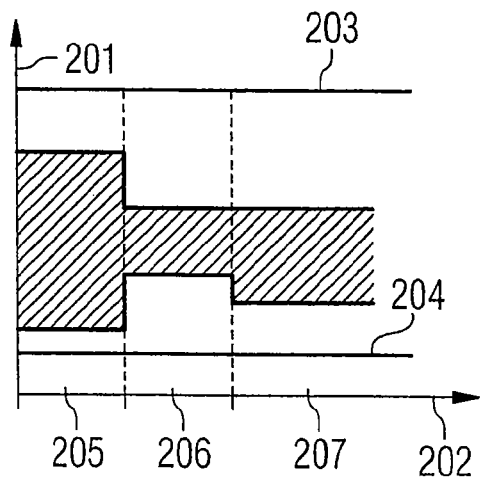
FIG. 2*a* shows a schematic representation of an adaptation of the dynamic range in a first embodiment.

FIG. 2a shows a schematic representation of an adaptation of the dynamic range in a first embodiment. The dynamic range is plotted along the ordinate 201 against time on the abscissa 202. Towards the top, the dynamic range is limited by a maximum limit value 203. The maximum limit value 203 is determined by the compression point $CP_{1dB}$ for the case of a worst case scenario. Towards the bottom, the dynamic range is limited by a minimum limit value 204. The lower limit value 204 is determined by the noise figure NF which meets the required sensitivity specifications.

FIG. 2a shows that both dynamic limits can be adapted. In a first time interval 205, a high power level of an interference signal is present so that both the upper dynamic limit is selected to be high whilst the lower dynamic limit is close to the limit value of the sensitivity of the receiving device. Both dynamic limits must lie within the dynamic range determined by the maximum limit value 203 and the minimum limit value 204. In a second time interval 206, a narrow dynamic range can be selected due to the low power of the interference signal in comparison with the first time interval 205. For this purpose, both the compression point and the noise figure of the receiving device are shifted. Both values move away from the respective limit values 203 and 204, respectively. In this range, a particularly high current saving potential is used for the receiving device. In a third time interval 207, the noise figure of the receiver is moved closer to the minimum limit value 204 again since a high sensitivity of the receiving device is required due to a poorer signal/noise ratio which can be produced, for example, by a dip in the power of the useful signal.

Figure 2B:
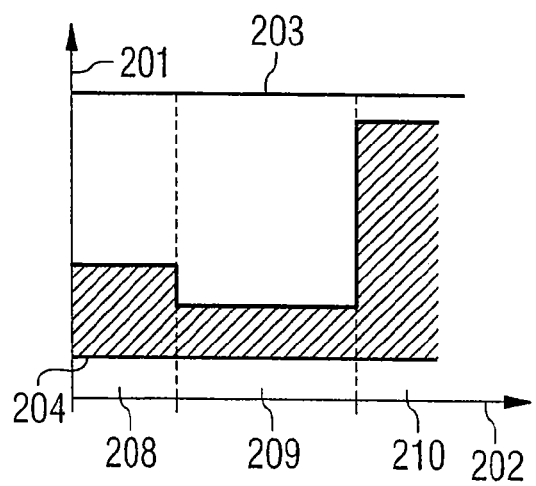
FIG. 2*b* shows a schematic representation of an adaptation of the dynamic range in a second embodiment.

FIG. 2b shows a schematic representation of an adaptation of the dynamic range according to a second embodiment. The sequence shown in FIG. 2b differs only in a few points from the sequence shown in FIG. 2a. For this reason, the same reference signals have been selected in FIG. 2b apart from the aspects differing from FIG. 2a.

In FIG. 2b, only the compression point $CP_{1dB}$ of the receiving device is adapted. At the same time, it is ensured that the noise figure of the receiving device corresponds to the sensitivity specifications required by the system. In a fourth time interval 208, the power of the interference signal is slightly increased and the compression point must be selected for a particular value. In a subsequent fifth time interval 209, the interference power is slightly lower so that the compression point of the receiving device can be lowered. This reduces the current consumption of the receiving device. In a sixth time interval 210, a high power level of an interference signal is present so that the compression point is close to the maximum limit value 203. The sequence shown in FIG. 2b differs from the sequence shown in FIG. 2a, in particular, in that the noise figure of the receiving device is not adapted. It is not required, therefore, that the baseband-processor provides channel information to the detector unit. As a result, the entire circuit complexity of the receiving device can be advantageously reduced since no digital signal processing is necessary for determining the channel quality from the channel information provided by the baseband-processor. With digital signal processing, the information about channel quality is delayed in time.

Figure 3:
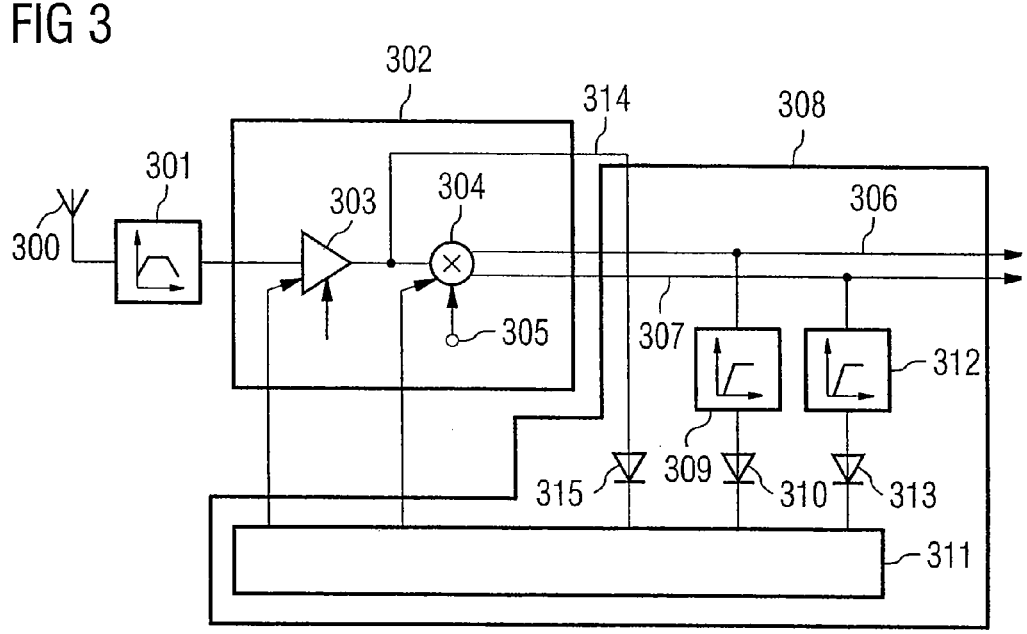
FIG. 3 shows a circuit diagram of a receiving device in accordance with an exemplary embodiment.

FIG. 3 shows a circuit diagram of a receiving device according to an exemplary embodiment. The receiving device has an antenna 300 for receiving a radio signal which is transmitted by a transmitter not shown in FIG. 3. The radio signal is composed of a useful signal and an interference signal. The antenna 300 is connected to a bandpass filter 301 which is used for selecting a transmission channel or band, e.g. 925-960 MHz in the case of GSM. The bandpass filter 301 removes unwanted signal components of the radio signal outside the transmission channel from the radio signal and thus provides an input signal restricted to the bandwidth of the transmission channel.

The bandpass filter 301 is connected to a demodulator 302. In the exemplary embodiment shown, the demodulator 302 consists of an amplifier 303 and a mixer element 304. The amplifier 303 is designed, for example, as low noise amplifier (LNA) architecture in order to keep noise contributions of the demodulator 302 and possibly following stages as low as possible during signal processing.

An input of the amplifier 303 is connected to the bandpass filter 301 in order to receive the input signal. The input signal is amplified by the amplifier 303 and then provided as intermediate signal at an output of the amplifier 303. The output of the amplifier 303 is connected to a first input of the mixer element 304. At a second input 305 of the mixer element 304, a frequency signal of a local oscillator (LO) is provided. The frequency signal can be generated by a voltage-controlled oscillator (VCO) as LO. For this purpose, the VCO can be controlled, for example, by a phase-locked loop (PLL) in order to generate the required frequency signal.

The mixer element 304 shifts the intermediate signal from the frequency of the transmission channel into a baseband signal by mixing the intermediate signal with the frequency signal. This corresponds to a demodulation of a carrier frequency belonging to the transmission channel into an intermediate-frequency signal, the intermediate frequency usually corresponding to a baseband, i.e. a frequency of 0 Hz or close to 0 Hz. The carrier frequency of the transmission channel can be static, i.e. constant with time. However, it can also be time-variable as is the case, for example, in so-called frequency hopping methods.

By mixing the intermediate signal with the frequency signal, the mixer element 304 generates an in-phase baseband signal and a quadrature baseband signal. The receiving device is thus suitable for receiving phase- or quadrature-modulated useful data such as are used, for example, in mobile radio systems such as GSM or UMTS. The architecture of the receiving device shown corresponds to a direct conversion architecture of a receiving device.

The in-phase baseband signal is provided at an in-phase output 306 and the quadrature baseband signal is provided at a quadrature output 307. The in-phase output 306 and the quadrature output 307 are connected to a detector 308. For this purpose, the in-phase input 306 is connected to a first high-pass filter 309 provided in the detector 308. The first high-pass filter 309 selects signals outside the spectrum of a useful-data component of the in-phase baseband signal. The selected signal is provided to a first diode 310, an input of the first diode 310 being connected to the first high-pass filter 309 and an output of the first diode 310 being connected to a signal processor 311 in the detector 308.

Due to the signal selected by the first high-pass filter 309, the signal processor 311 can determine the power of an interference-signal component in the received signal. A similar determination of power is performed by a second branch where the quadrature output 307 is connected to the signal processor 311 via a second high-pass filter 312 and a second diode 313. The signal processor 311 is coupled to the amplifier 303 and the mixer element 304 in order to adjust the operating point in each case. The operating points of the amplifier 303 and/or of the mixer element 304 are switched over by using a threshold detector which, when the power level of the interference signal drops below a threshold value, changes to a current saving mode of the corresponding component of the demodulator 302 and if the power level of the interference signals exceeds the threshold value, changes, e.g. into a normal or maximum current mode. The determination of the power level of the interference signals takes into consideration that the signal is already selected in the entire receiver chain of the receiving device by means of the transfer function $H_{PF}$ (f) of the bandpass filter 301 and a transfer function $H_{HF}$ (f) of the first high-pass filter 309 in the analog baseband. Thus, both filter elements select the relevant power level of the interference signal from the power spectral density $L_m$ (f) of the interference spectrum. Very large interference signals located in more distant adjacent channels of the radio system outside one's own radio receiving system, and also the transmit frequencies located within one's own system, are called blocking signals or briefly blockers. The name should illustrate that very large interference signals lower one's own very weak useful signal by overdriving the stages located in the signal processing section and "block" at very high interference levels. In the text which follows, the power spectrum of the interference signals is, therefore, also called a blocker spectrum.

The power level of the blocker spectrum determined in the detector 306 is obtained from the equation $$P_{BL} = \int_{f_0 - \frac{B_{PF}}{2}}^{0} (L_m(f) \cdot |H_{PF}(f)|^2 \cdot |H_{HF}(-f)|^2) df +$$

$$\int_{0}^{f_0 + \frac{B_{PF}}{2}} (L_m(f) \cdot |H_{PF}(f)|^2 \cdot |H_{HF}(f)|^2) df$$

where f is a frequency offset of the received signal from the useful frequency, $B_{PF}$ is the bandwidth of the bandpass filter 301.

As a rule, it is sufficient to measure the power level either via the in-phase baseband component or quadrature baseband component of the output signal. The use of both components, shown in FIG. 3, is an option for determining the power level which is obtained from equation $(I^2+Q^2)^{1/2}$. It is of importance to use a multiplier with high bandwidths in the signal processor 311. As broadband squarer (multiplier), by way of example, a multiplier circuit as described in DE 101 34 754 A1 can be used.

The circuit shown in FIG. 3 has a connection of the output of the amplifier 303 to a third diode 315 via a connecting line 314, and also to the signal processor 311. This provides a further detector for determining the radio-frequency signal power existing at the output of the amplifier 303. It ensures that in the case of overdriving, the amplifier 303 of the receiving device, which is in current saving mode, can be reliably switched back into a normal mode. Such overdriving of the amplifier 303 entails a faulty measurement of the blocker power in the baseband signal.

Figure 4:
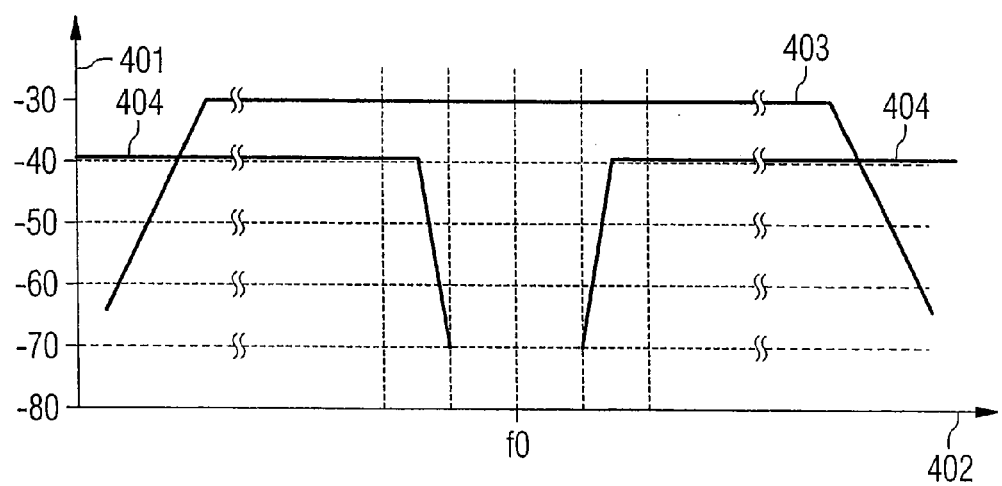
FIG. 4 shows the filter spectrum of various filter elements of the embodiment according to FIG. 3.

FIG. 4 shows filter spectra of the various filter elements of the embodiment according to FIG. 3.

For this purpose, the power spectrum is specified as the suppression spectrum of the filters along an ordinate 401. The power spectrum is plotted against a frequency range on the abscissa 402. The frequency range is centered about a carrier frequency $f_0$.

Curve 403 shows the attenuation characteristic of the bandpass filter 301 in FIG. 3 whilst curve 404 reproduces an attenuation characteristic of one of the high-pass filters from FIG. 3.

Figure 5:
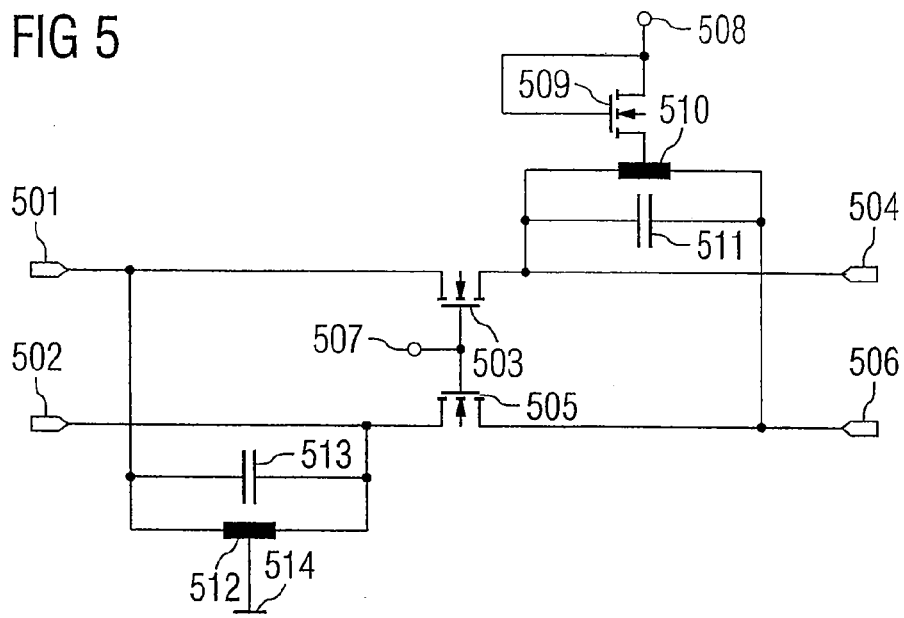
FIG. 5 shows an amplifier of a receiving device according to an embodiment.

FIG. 5 shows an amplifier in a receiving device according to one embodiment. The amplifier is constructed as differential amplifier. It has a first input 501 receiving an input signal and a second input 502 receiving the negated input signal. The first input 501 is connected to a first output 504 via a source-drain path of a first transistor 503. The second input 502 is connected to a second output 506 via a source-drain path of a second transistor 505.

The gate terminal of the first transistor 503 and the gate terminal of the second transistor 505 is connected to a bias input 507. To supply the amplifier with voltage, a supply voltage terminal 508 is provided which is connected to a center tap of a first impedance 510 via a diode-connected third transistor 509. An input of the first impedance 510 is connected between the drain terminal of the first transistor 503 and the first output 504. An output of the first impedance 510 is connected to the drain terminal of the second transistor 505 and the second output 506. A capacitance 511 is connected in parallel with the first impedance 510. The first impedance 510 and the first capacitance 511 establish the output impedance of the amplifier.

The source terminal of the first transistor 503 and the first input 501 are connected to the input of a second impedance 512. An output of the second impedance 512 is connected to the second input 502 and the source terminal of the second transistor 505. A second capacitance 513 is connected in parallel with the second impedance 512. A ground terminal 514 is connected to a center tap of the second impedance 512. The second impedance 512 and the second capacitance 513 define the input impedance of the amplifier.

The amplifier shown is a so-called common-gate structure which has the advantage that large changes in quiescent current result in almost no change in the magnitude of the amplification because the amplification is essentially determined by the ratio of load impedance to source impedance at the amplifier. The operating point of the amplifier is changed via the bias terminal 507. If the bias is increased, the amplifier draws less current as a result of which the current consumption overall is lowered.

Figure 6A:
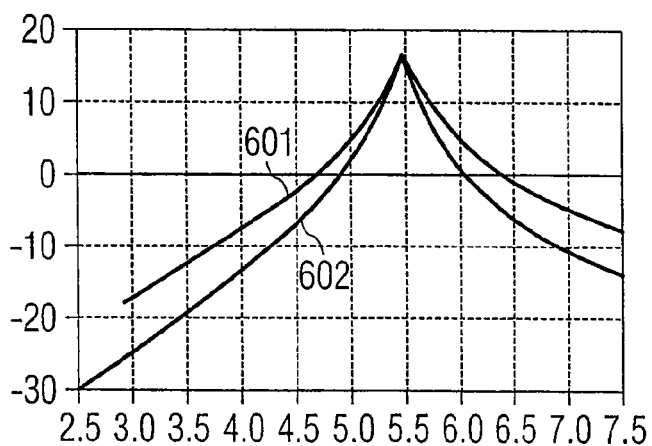
FIG. 6*a* shows the amplification spectrum of an amplifier according to FIG. 5.

FIG. 6a shows an amplification spectrum of an amplifier according to FIG. 5. For this purpose, the gain in amplification is plotted in dB along the ordinate. This is shown as a function of a frequency along the abscissa. In the example of an amplification spectrum shown for a WLAN system, the frequency is in the order of magnitude of GHz. A curve 601 shows the gain in amplification versus frequency with a current consumption of 5 mA maximum. A curve 602 shows the gain in amplification versus frequency with a current consumption of 1.2 mA maximum. Thus, curve 602 shows a current saving mode. It can be seen that the amplification of the amplifier remains essentially constant independently of the change of permissible maximum current.

Figure 6B:
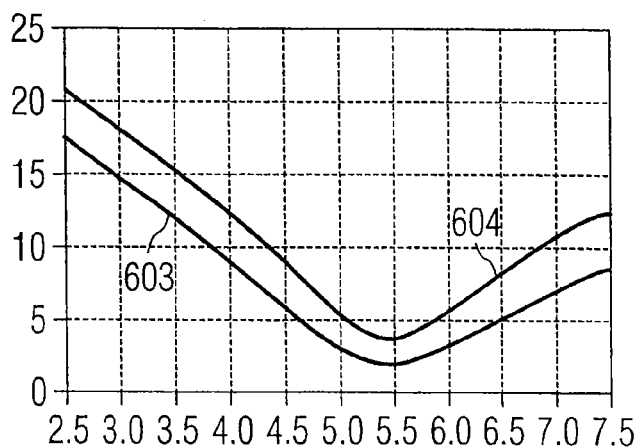
FIG. 6*b* shows the noise spectrum of an amplifier according to FIG. 5.

FIG. 6b shows a noise spectrum of an amplifier according to FIG. 5. For this purpose, the noise figure is plotted along the ordinate versus a frequency along the abscissa. As in FIG. 6a, this is an example of a WLAN system so that the frequencies are specified in orders of magnitude of GHz. Curve 603 reproduces the noise figure with a maximum current of 5 mA and curve 604 reproduces the noise figure with a maximum current of 1.25 mA. It is shown that the noise figure changes only insignificantly despite the lowering of the current consumption, especially at a central frequency of 5.5 GHz. In the present case, this is a change of approx. 1.5 dB as a result of which the noise figure of the complete receiver changes by low values with constantly high amplification of the amplifier. The sensitivity remains distinctly below the receiver noise figure of approx. 10 dB required by the system.

Figure 7:
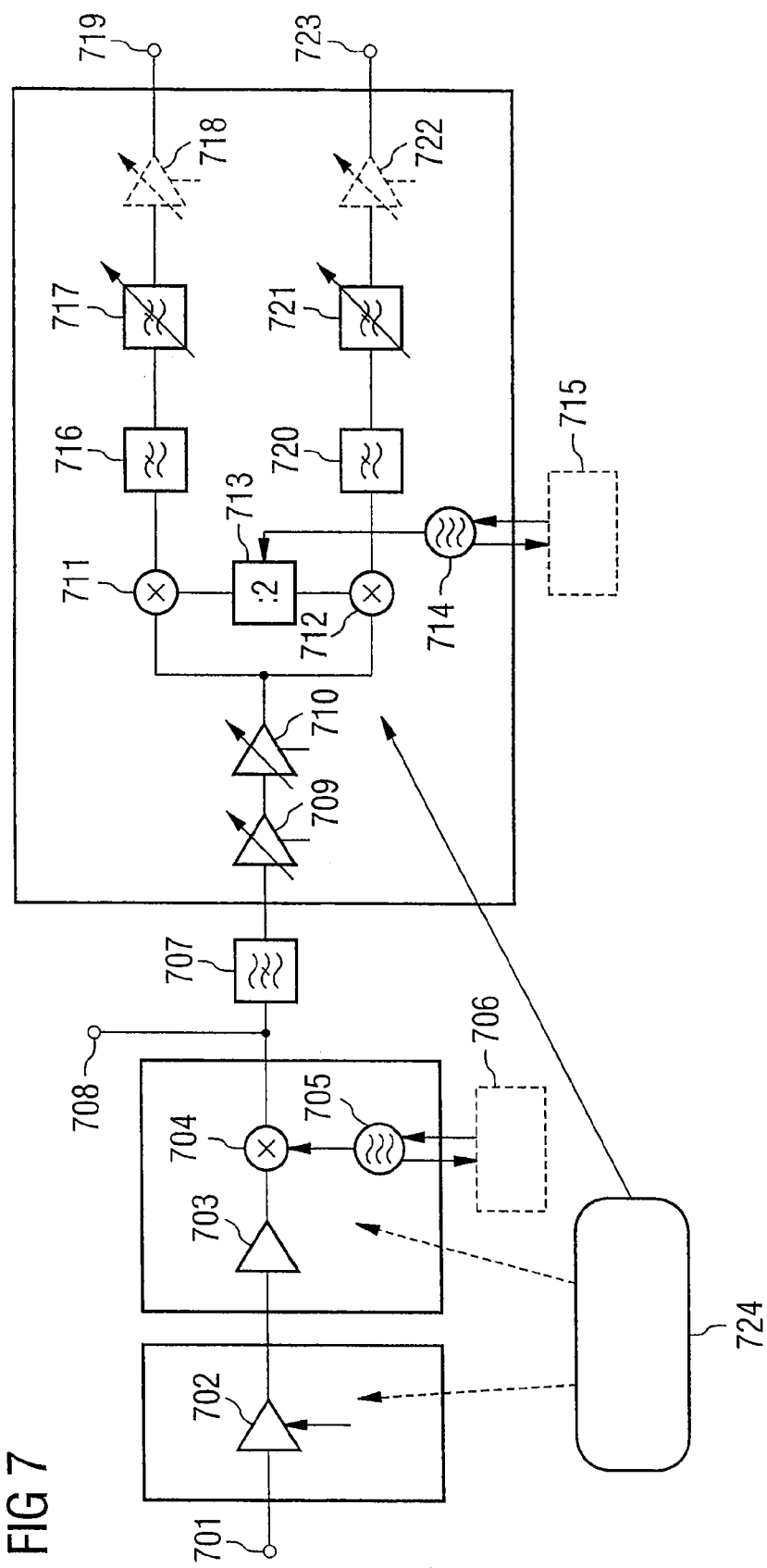
FIG. 7 shows a schematic representation of a circuit of a further exemplary embodiment.

FIG. 7 shows a schematic representation of a circuit of a further exemplary embodiment. The receiving device shown in FIG. 7 has a first input 701 by means of which signals can be received at a carrier frequency of, e.g. 24 GHz. The input signal received at the first input 701 is amplified via a first amplifier 702 and forwarded to a second amplifier 703. An output of the second amplifier 703 is connected to a first mixer element 704. An output signal of the second amplifier 703 is mixed with a first frequency signal, the first frequency signal being generated in a first voltage-controlled oscillator 705. The frequency signal generated by the first voltage-controlled oscillator 705 is defined by a first phase-locked loop 706. An intermediate-frequency signal down-converted to an intermediate frequency in this manner is provided at the output of the first mixer element 704. The intermediate-frequency signal is a carrier frequency of, e.g. 5 GHz. The output of the first mixer element 704 is connected to an input of a bandpass filter 707. In addition, a second input for a second input signal 708 is connected to the input of the bandpass filter 707. In this manner, input signals in the range of 24 GHz and input signals in the range of 5 GHz can be input into the receiving device.

An output of the bandpass filter 707 is connected to an input of a third amplifier 709 and a fourth amplifier 710 connected thereto in series. A signal output of the fourth amplifier 710 is connected to the input of a second mixer element 711. The signal output is also connected to the input of a third mixer element 712. The second mixer element 711 and the third mixer element 712 are in each case connected via their second input to a frequency divider 713 via which they are supplied with a frequency signal of a second voltage-controlled oscillator 714. The second voltage-controlled oscillator 714 is controlled by a second phase-locked loop 715. An output signal of the second mixer element 711 is coupled to a fifth amplifier 718 at an in-phase output 719 via a first low-pass filter 716 and a second low-pass filter 717 connected thereto in series. The output of the third mixer element 712 is coupled to a sixth amplifier 722 and a quadrature phase output 723 via a third low-pass filter 720 and a fourth low-pass filter 721 connected thereto in series. This circuit architecture is suitable for processing received signals transmitted at different frequencies.

The dynamic range is adapted by a detector 724 which is coupled to the first amplifier 702, the second amplifier 703 and the fourth amplifier 710. The detector 724 in each case adjusts the operating point there. The operating point is adapted at the individual amplifiers as a function of the signals provided by the receiving device at the in-phase output 719 or the quadrature output 723, from which the power of a blocker spectrum is determined analogously to that shown in FIG. 3.

According to one embodiment, the basic concept may be monitoring of the signal/noise ratio and/or of the power of the blocker spectrum. Instead of directly measuring signal and noise, the signal quality of the useful channel is preferably determined by informative values such as the BER or EVM value. The dynamic range of the receiving device will be or is adapted as a function of the quantities monitored.

For example, two possibilities may be provided, either to adapt the noise limit and large-signal compatibilities or the compression number CP or to adapt the compression point CP whilst simultaneously ensuring a receiver noise figure which meets the sensitivity specifications required by the system. This takes into consideration various effects of signal degradation in the receiving device. The effects considered are, for example, a reciprocal mixing or a loss of amplification, triggered by blocker signals, of a small useful signal. Reciprocal mixing is produced when the signal of a local oscillator is superimposed on the input signal. During this process, the phase noise of the local oscillator is transferred to an interference signal. As a result, the spectrum of the interference signal reaches into the converted useful-signal spectrum. As a result, the noise power in the useful band is increased or, respectively, the receiver noise figure NP is worsened. The significance of the embodiments may increase for future receiver concepts since a number of receiving paths are processed simultaneously in the systems, for example in a so-called MIMO (multiple in multiple out) concept. Similarly, receiving systems with multi-channel front ends such as, e.g. smart antenna concepts, can be advantageously equipped. The described embodiments are of great interest even in conventional systems, i.e. so-called SISO (single in single out architecture) systems, in order to lower the current drawn by the receiving device.

Naturally, the receiving device can be used both in wireless transmission systems and in wire-connected transmission systems.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A receiving device, comprising:
an input for receiving an input signal which comprises a useful signal and an interference signal,
a demodulator coupled to the input and configured to generate a demodulated output signal from the input signal,
a detector coupled to the demodulator, the detector comprising a high-pass filter configured to select an interference signal from the output signal of the demodulator, wherein the detector is configured to determine from the selected interference signal a characteristic value representing a power level of the interference signal and to set an operating point of the demodulator as a function of the determined characteristic value, and
a data processor coupled to the demodulator and configured to convert the output signal into a useful digital signal, the data processor being further configured to determine a characteristic number for the signal quality of the output signal from the useful digital signal.

2. The receiving device as claimed in claim 1, wherein the data processor is further coupled to the detector and the detector is further configured to adjust the operating point as a function of the characteristic number.

3. The receiving device as claimed in claim 1, wherein the demodulator includes an amplifier with a common-gate structure.

4. The receiving device as claimed in claim 1, wherein the receiving device is arranged in a multi-channel receiving device configured to receive at least two receiving channels.

5. A receiving device, comprising:
an input configured to receive an input signal which comprises a useful signal and an interference signal,
a demodulator with an adjustable operating point, the demodulator being coupled to the input and configured to generate a demodulated output signal from the input signal,
a detector coupled to the demodulator, the detector comprising a high-pass filter configured to select an interference signal from the output signal of the demodulator, wherein the detector is configured to determine from the selected interference signal a characteristic value representing a power level of the interference signal and set the operating point of the demodulator as a function of the determined characteristic value, and
a data processor coupled to the demodulator and configured to convert the output signal into a useful digital signal and to determine a characteristic number for the signal quality of the output signal from the useful digital signal,
wherein the data processor is coupled to the detector and the detector is further configured to adjust the operating point as a function of the characteristic number.

6. The receiving device as claimed in claim 5, wherein the demodulator includes an amplifier with a common-gate structure.

7. The receiving device as claimed in claim 5, wherein the receiving device is arranged in a multi-channel receiving device configured to receive at least two receiving channels.

8. A method of adapting a dynamic range of a receiving device, the method comprising:
receiving a received signal which exhibits a useful signal and an interference signal,
demodulating the received signal, thereby generating a demodulated output signal from the received signal, wherein the demodulated output signal comprises the useful signal and the interference signal,
selecting the interference signal from the demodulated output signal via a high-pass filter,
determining a characteristic number from the interference signal which represents a power level of the selected interference signal,
adjusting at least one limit of the dynamic range as a function of the characteristic number,
converting the demodulated signal into a useful digital signal, and
determining a characteristic number for the signal quality of the output signal from the useful digital signal.

9. The method as claimed in claim 8, further comprising:
adjusting an operating point as a function of the characteristic number for the signal quality.

10. The method as claimed in claim 8, wherein the receiving device is arranged in a multi-channel receiving device for receiving at least two receiving channels.

11. A receiving device, comprising:
an input configured to receive an input signal which comprises a useful signal and an interference signal,
a demodulator with a settable operating point coupled to the input and configured to generate a demodulated output signal from the input signal,
a detector coupled to the demodulator, the detector comprising a high-pass filter configured to select an interference signal from the output signal of the demodulator, wherein the detector is configured to determine from the selected interference signal a characteristic value representing a power level of the interference signal and to set the operating point of the demodulator as a function of the determined characteristic value, and
a data processor coupled to the demodulator and configured to convert the output signal into a useful digital signal, the data processor being configured to determine a characteristic number for the signal quality of the output signal from the useful digital signal, wherein the demodulator includes an amplifier with a common-gate structure.

12. The receiving device as claimed in claim 11, wherein the data processor is coupled to the detector and the detector is further configured to adjust the operating point as a function of the characteristic number.

13. The receiving device as claimed in claim 11, which is arranged in a multi-channel receiving device for receiving at least two receiving channels.

14. A receiving device, comprising:
an input for receiving an input signal which comprises a useful signal and an interference signal,
a demodulator coupled to the input and configured to generate a demodulated output signal from the input signal,
a detector coupled to the demodulator and configured to determine from the output signal a characteristic value representing a power level of the interference signal and to set an operating point of the demodulator as a function of the determined characteristic value, wherein the detector comprises a high-pass filter configured to select an interference signal from the output signal, and
a data processor coupled to the demodulator and configured to convert the demodulated output signal into a useful digital signal and to determine a characteristic number for the signal quality of the demodulated output signal from the useful digital signal.

15. The receiving device as claimed in claim 14, wherein the data processor is coupled to the detector and the detector is further configured to adjust the operating point as a function of the characteristic number.

16. The receiving device as claimed in claim 14, wherein the demodulator comprises an amplifier with a common-gate structure.

17. The receiving device as claimed in claim 14, which is arranged in a multi-channel receiving device for receiving at least two receiving channels.

* * * * *